(No Model.) 2 Sheets—Sheet 1.
F. J. WOOD.
MOP WRINGER.
No. 427,817. Patented May 13, 1890.
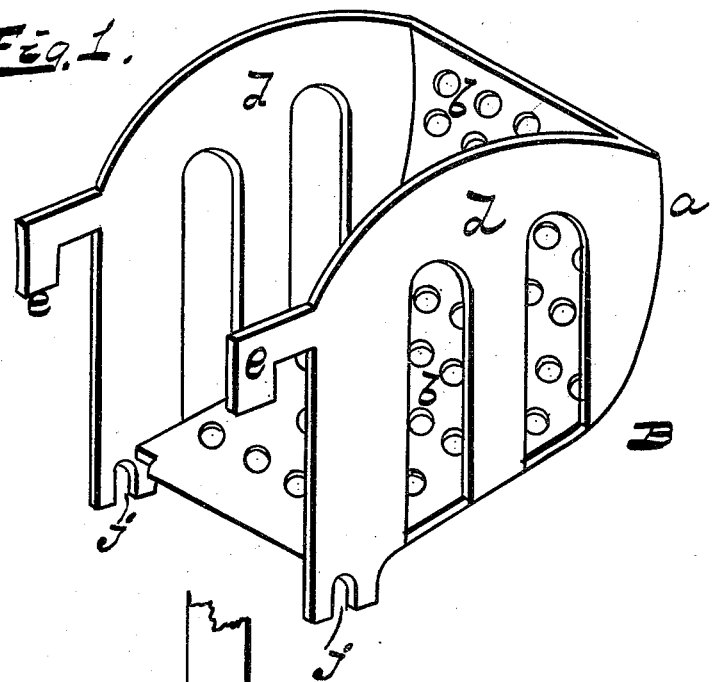
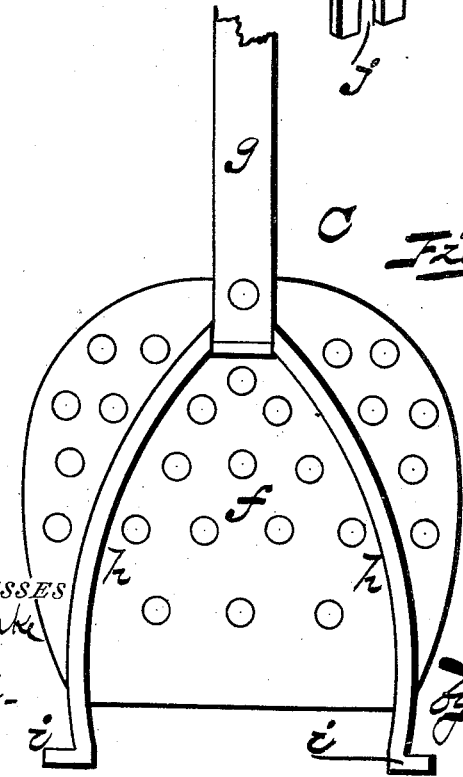
WITNESSES
Jas. B. Clarke
James A. White
INVENTOR.
F. J. Wood
by E. H. Bates
Attorney (No Model.) 2 Sheets—Sheet 2.
F. J. WOOD.
MOP WRINGER.
No. 427,817. Patented May 13, 1890.
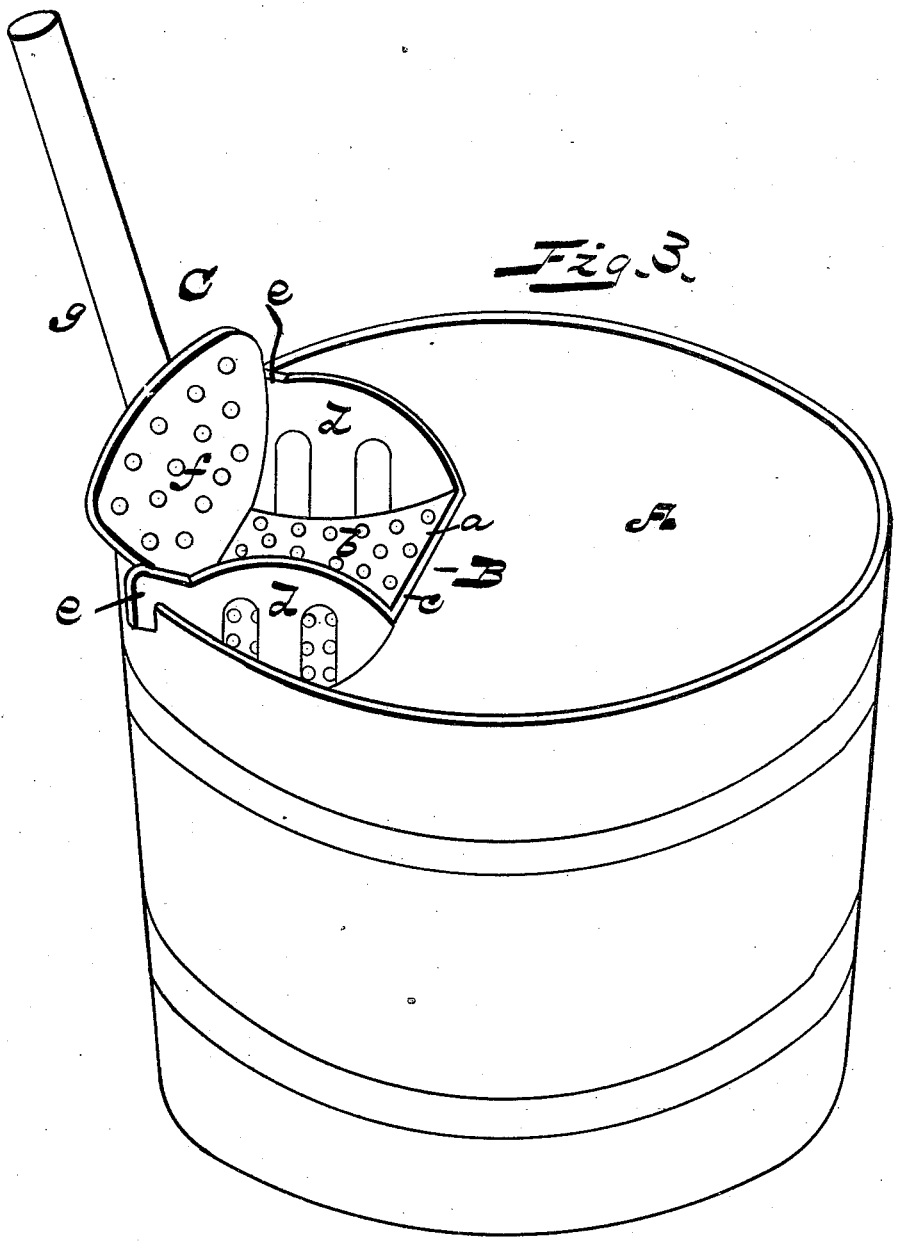
WITNESSES
Jas B. Clarke
James A. White
INVENTOR
F. J. Wood
E. H. Bates
Attorney

UNITED STATES PATENT OFFICE.

FRANCIS J. WOOD, OF GREENVILLE, MICHIGAN.

MOP-WRINGER.

SPECIFICATION forming part of Letters Patent No. 427,817, dated May 13, 1890.

Application filed February 18, 1890. Serial No. 340,900. (No model.)

*To all whom it may concern:*

Be it known that I, FRANCIS J. WOOD, a citizen of the United States, residing at Greenville, in the county of Montcalm and State of Michigan, have invented certain new and useful Improvements in Mop-Wringers; and I do hereby declare the following to be a full, clear, and exact description of the invention, such as will enable others skilled in the art to which it appertains to make and use the same.

This invention relates to improvements in that class of devices known as "mop-wringers;" and it consists in combining a perforated plate with a perforated receptacle for the mop and adapted to be attached to a tub or other pail, all as will be presently fully explained.

The annexed drawings, to which reference is made, fully illustrate my invention, in which—

Figure 1 represents a perspective view of my device. Fig. 2 is a rear view of the presser, and Fig. 3 is a perspective view showing my device applied to a tub.

Referring by letter to the accompanying drawings, A designates a pail, tub, or other receptacle for water, and B represents a receptacle for the mop. This receptacle B consists of a perforated or slatted portion *a*, which curves forward and upward, providing a bottom *b* and front *c*, and the same has side pieces *d d*, which are also perforated or slatted, as shown, while the top and rear of this receptacle are left open, and the rear is provided with hooks *e e*, which engage the rim of the tub, whereby the receptacle is removably secured thereto.

C indicates a presser, which consists of the perforated plate *f*, or instead of perforations the same may be slatted and provided with a handle *g*. The ends of the bifurcated portions *h h* are provided with hooks *i i*, which, when the presser is in position in the receptacle B, engage the forked ends *j j* of said receptacle and provide a hinge-connection between said presser and receptacle.

It will be readily seen that when it is desired to wring or squeeze the water from a mop said mop is put into the receptacle B and the operator brings to bear upon it the perforated plate by drawing the handle thereof forward, thus forcing what water there is in said mop out through the perforations in said receptacle, and it is easily applied to a pail or tub, easily and quickly operated, durable, and at the same time cheap to manufacture.

Having thus described my invention, what I claim, and desire to secure by Letters Patent, is—

The within-described mop-wringer, consisting of the receptacle B, composed of the upwardly and forwardly curved bottom *b*, forming the front thereof, the sides *d d*, provided with the hooks *e e* and bearings *j j*, said bottom having perforations, and the presser detachably connected to said receptacle and consisting of the handle *g*, the arms *h h*, terminating in the journals or hooks *i i*, adapted to engage said bearings, and the perforated plate, all as and for the purpose set forth.

In testimony whereof I affix my signature in presence of two witnesses.

FRANCIS J. WOOD.

Witnesses:
 ROY C. ECKER,
 A. J. ECKER.